United States Patent [19]
Sypula et al.

[11] Patent Number: 5,758,753
[45] Date of Patent: Jun. 2, 1998

[54] MODULAR SYNCHRONIZER ASSEMBLY

[75] Inventors: Anthony M. Sypula, Muncie, Ind.;
John R. Forsyth, Romeo, Mich.

[73] Assignee: New Venture Gear, Inc., Troy, Mich.

[21] Appl. No.: 596,991

[22] Filed: Feb. 5, 1996

[51] Int. Cl.$^6$ .................................................. F16D 23/06
[52] U.S. Cl. ........................................ 192/53.32; 192/53.34
[58] Field of Search ........................ 192/53.32, 53.34, 192/66.21, 70.15, 53.341, 53.342, 53.343; 74/339

[56] References Cited

U.S. PATENT DOCUMENTS

| | | | |
|---|---|---|---|
| 945,250 | 1/1910 | Soderling | 192/66.21 |
| 3,272,291 | 9/1966 | Flinn | 192/53.343 X |
| 4,687,081 | 8/1987 | Osterloff et al. | 192/53.32 |
| 4,901,835 | 2/1990 | Frost | |
| 5,085,303 | 2/1992 | Frost | |
| 5,135,087 | 8/1992 | Frost | |

*Primary Examiner*—Rodney H. Bonck
*Attorney, Agent, or Firm*—Harness, Dickey & Pierce, P.L.C.

[57] ABSTRACT

The present invention is directed to a modular synchronizer assembly defined by a set of common components that can be used to assemble either of a single-cone synchronizer or a dual-cone synchronizer for use in motor vehicle power transfer devices such as manual transmission, transaxles and four-wheel drive transfer cases.

15 Claims, 6 Drawing Sheets

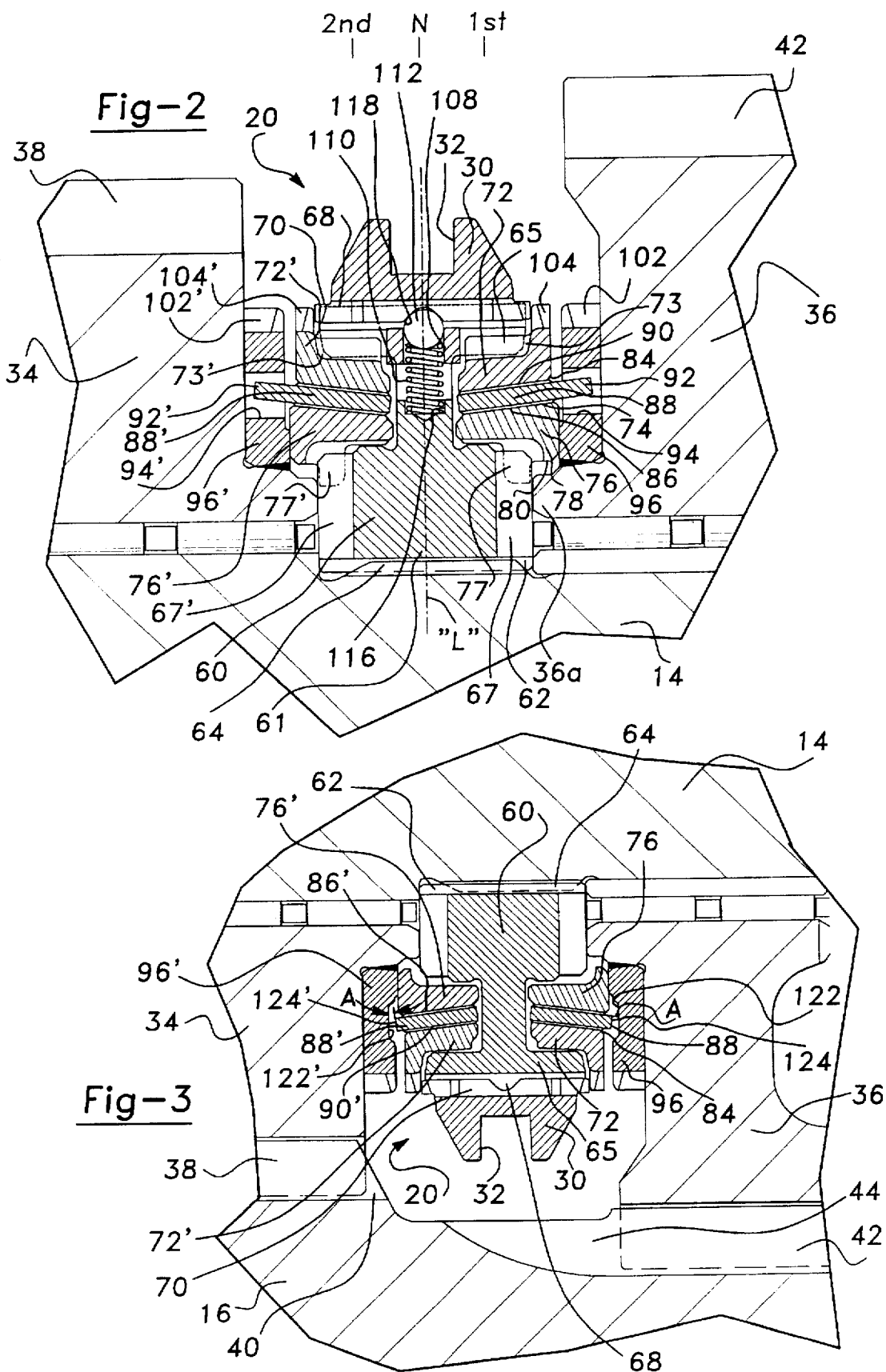

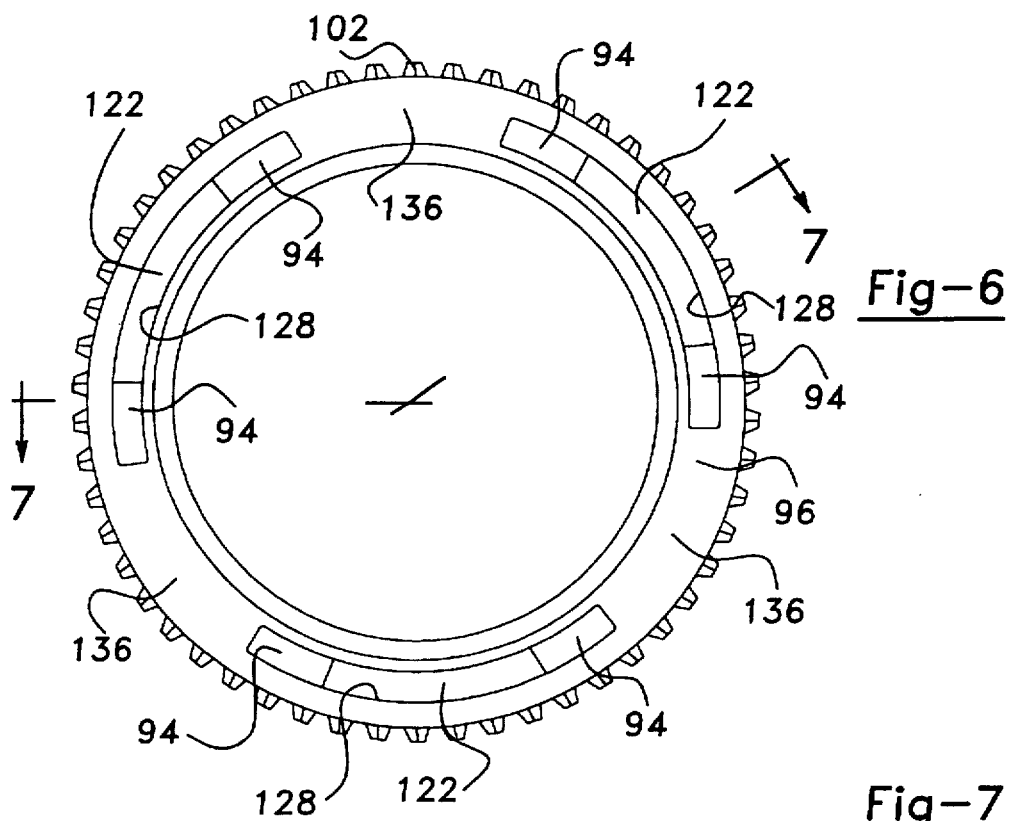
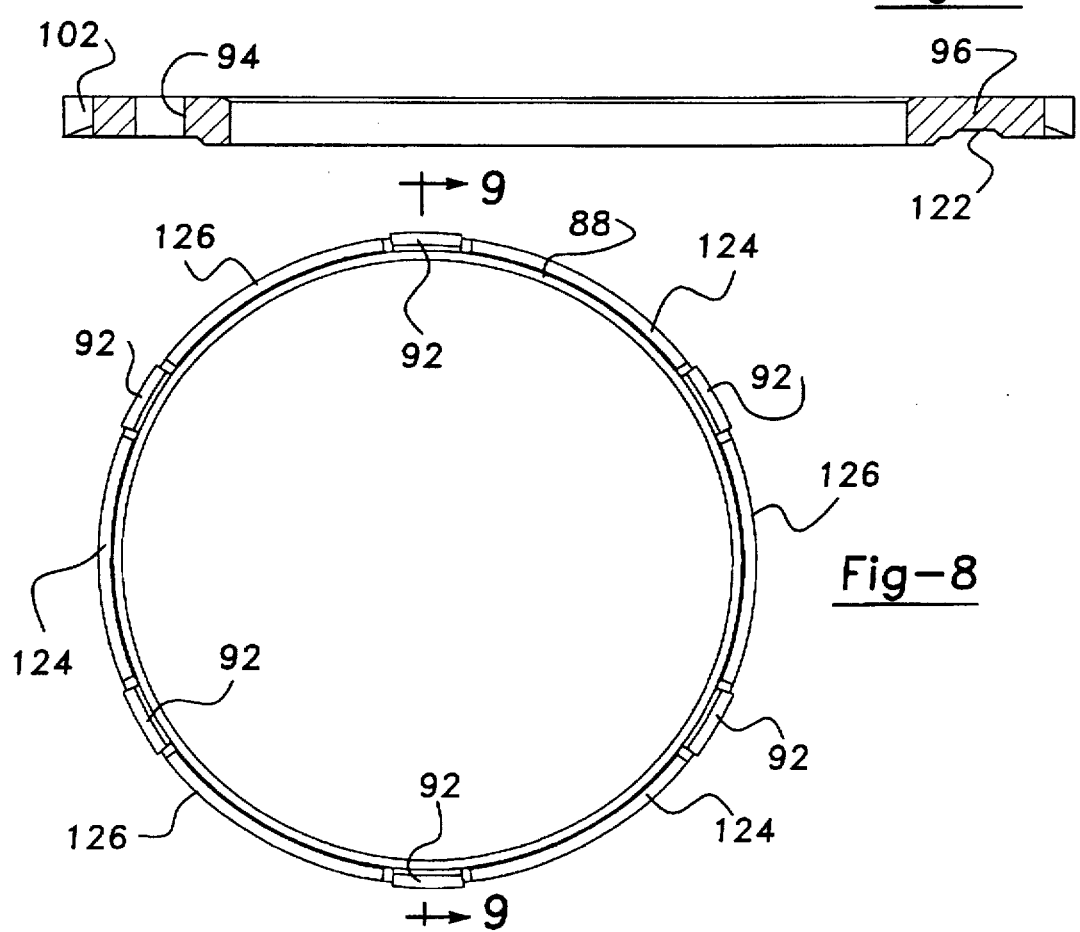

MODULAR SYNCHRONIZER ASSEMBLY

BACKGROUND OF THE INVENTION

1. Field of the Invention

The present invention relates generally to cone-type synchronizers for use in manual transmissions and the like. More particularly, a modular synchronizer assembly is disclosed that is capable of being used in multi-cone synchronizer arrangements.

2. Description of Background Art

In general, most cone-type synchronizers used in automotive power transfer devices (i.e., manual transmissions, transaxles and transfer cases) are either of the single-cone or dual-cone variety. In single-cone synchronizers, an inner cone ring is typically fixed for rotation with a non-driven component (i.e., a speed gear or a drive sprocket) and an outer blocker ring is fixed for rotation with a driven component (i.e., a shaft), whereby axial movement of the blocker ring relative to the inner cone ring generates frictional "cone" torque for causing speed synchronization therebetween. In dual-cone synchronizers, a reaction cone ring is concentrically disposed between the outer blocker ring and the inner cone ring. Most commonly, the reaction cone ring is rotatably coupled to one of the driven and non-driven components while both the blocker ring and inner ring are rotatably coupled to the other thereof. Moreover, dual-cone synchronizers are typically designed so that the blocker ring and inner cone ring maintain the reaction cone ring in a proper spacial relationship relative to the component which is being synchronized. A proper spacial relationship is required in order to provide sufficient friction contact for complete synchronization. An example of a dual-cone synchronizer is shown in commonly-owned U.S. Pat. No. 5,135,087 which issued on Aug. 4, 1992 to Frost.

While conventional single-cone and dual-cone synchronizers perform satisfactorily for their intended purpose, a problem exists in the art in that the cone-type rings for single-cone and dual-cone synchronizers are not compatible with one another. Accordingly, it is desirable to provide a set of common components which can be utilized in a single-cone or a dual-cone synchronizer device.

SUMMARY OF THE INVENTION

It is an object of the present invention to provide a modular synchronizer assembly having a set of common components that can be arranged for building either a single cone synchronizer or a dual-cone synchronizer.

Another object of the present invention is to provide a modular synchronizer assembly which is simple in structure, inexpensive to manufacture, easy to mass produce and durable in use.

These and other objects of the present invention are obtained by providing a modular synchronizer assembly for use in a power transfer apparatus having a driven member and a non-driven member rotatably supported on the driven member. The modular synchronizer assembly includes a set of components comprised of: a hub adapted to be fixed for rotation with the driven member; a clutch plate adapted to be fixed to the non-driven member adjacent to the hub and which has clutch teeth formed thereon, the clutch plate also including a side surface with a plurality of apertures formed therein and axially-recessed surfaces formed between every other pair of apertures; a shift sleeve adapted to be coupled for rotation with the hub and axial movement thereon from a neutral position to an operative position whereat the shift sleeve engages the clutch teeth for coupling the non-driven member for common rotation with the driven member; a first ring adapted to be coupled for rotation with the hub and having an internal conical surface; a second ring adapted to be fixed for rotation with the hub and having an external conical surface; and a third ring adapted to be concentrically disposed between the first and second rings and having a first conical surface adapted for friction engagement with the internal conical surface of the first ring and a second conical surface adapted for frictional engagement with the external conical surface of the second ring, the third ring further including a plurality of axially-extending locking fingers which are adapted to be retained within the apertures in the clutch plate, axially-extending edge segments formed between every other pair of adjacent locking fingers, and axially-recessed edge segments formed between the remaining pairs of adjacent locking fingers.

In accordance with the modularity principles of the present invention, the set of components associated with the modular synchronizer assembly can be assembled into either a single-cone or dual-cone synchronizer for causing speed synchronization between the driven and non-driven members in response to movement of the shift sleeve to its operative position. Preferably, the first ring is a blocker ring, the second ring is an inner ring, and the third ring is a reaction ring. In the dual-cone arrangement, the reaction ring is located between the inner ring and the blocker ring with its locking fingers inserted into the apertures on the clutch plate such that its axially-extending edge segments are aligned with and define a gap relative to the axially-recessed surfaces of the clutch plate. Alternatively, in the single-cone arrangement, the inner cone is not used and the reaction ring is located with its locking fingers inserted into the apertures on the clutch plate such that its axially-recessed edge segments are aligned with the axially-recessed surfaces of the clutch plate and its axially-extending edge segments contact the side surface of the clutch plate.

Further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 2 is an enlarged partial view of the dual-cone synchronizer shown in FIG. 1;

FIG. 3 is an enlarged partial view of the dual-cone synchronizer shown in FIG. 1;

FIG. 6 is a side elevational view of the clutch gear used with the modular synchronizer assembly of the present invention;

FIG. 7 is a sectional view generally taken along line 7—7 of FIG. 6;

FIG. 8 is a side elevational view of a reaction cone ring associated with the modular synchronizer assembly of the present invention;

DETAILED DESCRIPTION OF THE PREFERRED EMBODIMENTS

Figure 1:
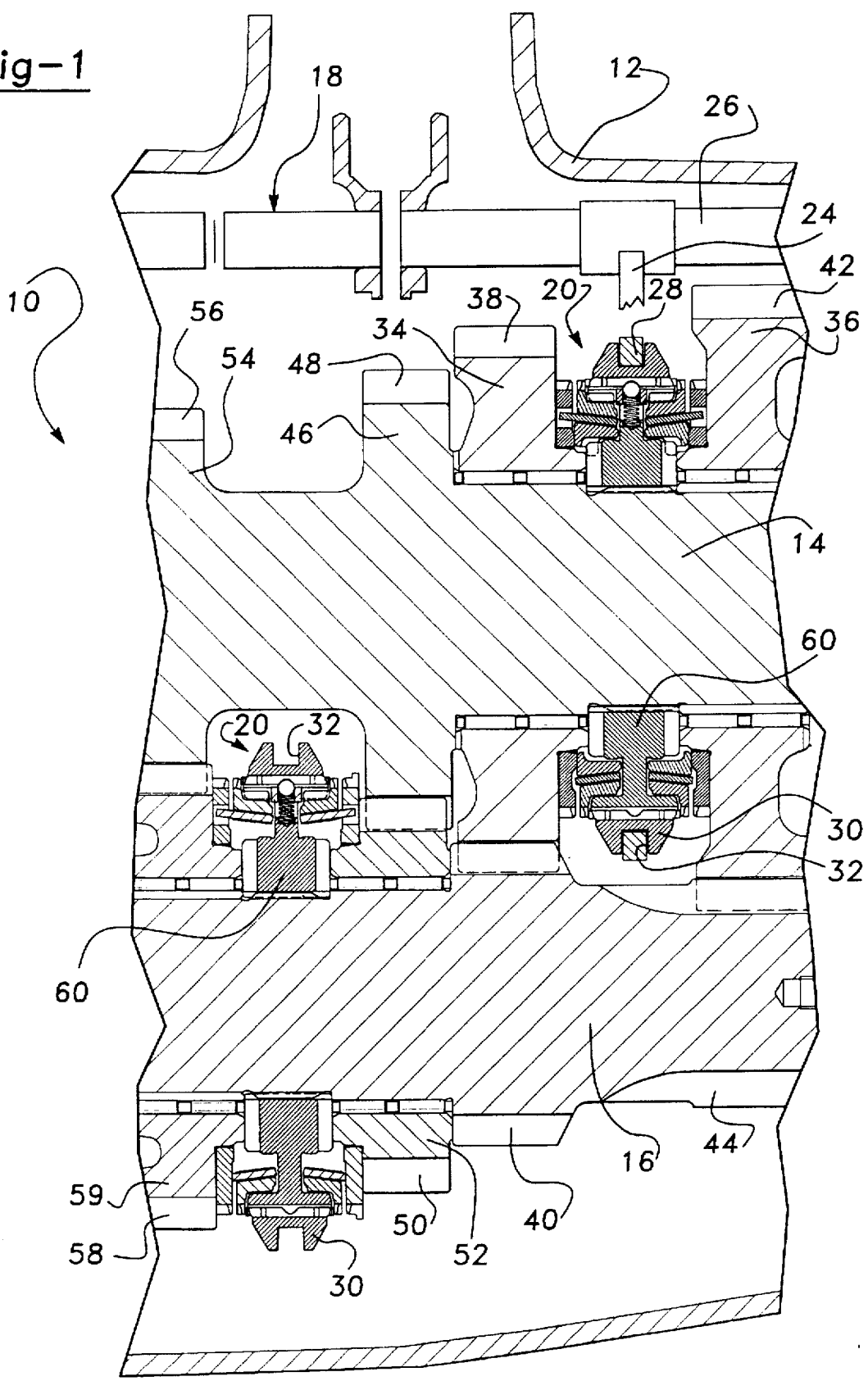
FIG. 1 is a fragmentary cross-sectional view of a portion of an exemplary manual transmission equipped with dual-cone and single-cone synchronizers each assembled from a modular synchronizer assembly according to the principles of the present invention.

Referring now to the drawings, and particularly to FIG. 1, a portion of an exemplary motor vehicle manual transmission 10 is shown. Reference may be had to commonly-owned U.S. Pat. No. 4,677,868 issued Jul. 7, 1987 to T. J. Filkins for a more detailed description of a manual transmission that is suitable for use with the present invention, the entire disclosure of which is hereby incorporated by reference. However, those skilled in the art will readily recognize that the present invention can be used with virtually any power transfer apparatus equipped with synchronizers.

Transmission 10 includes a gearbox housing, partially shown at 12, which rotatably supports an input shaft (not shown). As is conventional, the input shaft is connected by a suitable clutch mechanism to the vehicle engine's crankshaft (not shown). Transmission 10 also includes a mainshaft 14 and a countershaft 16 both of which are rotatably supported in gearbox housing 12. As is also conventional, a plurality of constant mesh gearsets are supported between mainshaft 14 and countershaft 16 for selectively delivering drive torque from the input shaft to mainshaft 14 at various speed ratios. Synchromesh clutch units are provided for selectively establishing each available speed ratio via manual actuation of a gearshift mechanism, partial shown at 18. Again, such conventional structure is shown and described in the above-mentioned Filkins patent.

As noted, transmission 10 includes a plurality of synchromesh clutch units, such as dual-cone synchromesh clutch unit 20 and single-cone synchromesh clutch unit 22. Dual-cone synchromesh clutch unit 20 is mounted on mainshaft 14 while single-cone synchromesh clutch unit 22 is mounted on countershaft 16. Each synchromesh clutch unit of transmission 10 is actuated by means of a shift fork, such as the shift fork for synchromesh clutch unit 20, partially indicated at 24, that is supported on a selector rail 26. As is conventional, shift fork 24 is longitudinally slidable with its selector rail 26 and is connected by a yoke, partial shown at 28, to a shift sleeve 30 by means of its circumferential groove 32. As will be detailed, synchromesh units 20 and 22 are assembled from a set of common components which together define a modular synchronizer assembly.

Synchromesh clutch unit 20 is shown located between a second speed gear 34 and a first speed gear 36, both of which are rotatably supported by suitable bearings on mainshaft 14. First speed gear 36 has its gear teeth 42 in constant meshed engagement with gear teeth 44 of a first drive gear integrally formed on countershaft 16, thereby defining a first speed ratio gearset. In a like manner, second speed gear 34 has its gear teeth 38 in constant meshed engagement with gear teeth 40 of a second drive gear integrally formed on countershaft 16, thereby defining a second speed ratio gearset. A third drive gear 46 is integrally formed on mainshaft 14 and is located adjacent to second speed gear 34 with its gear teeth 48 in constant mesh with gear teeth 50 of a third speed gear 52 that is rotatably supported on countershaft 16, thereby defining a third speed ratio gearset. Similarly, a fourth drive gear 54 is integrally formed on mainshaft 14 with its gear teeth 56 in constant mesh with gear teeth 58 of a fourth speed gear 59 that is rotatably supported on countershaft 16, thereby defining a fourth speed ratio gearset. Finally, synchromesh clutch unit 22 is shown located between third speed gear 52 and fourth speed gear 59.

Figure 12:
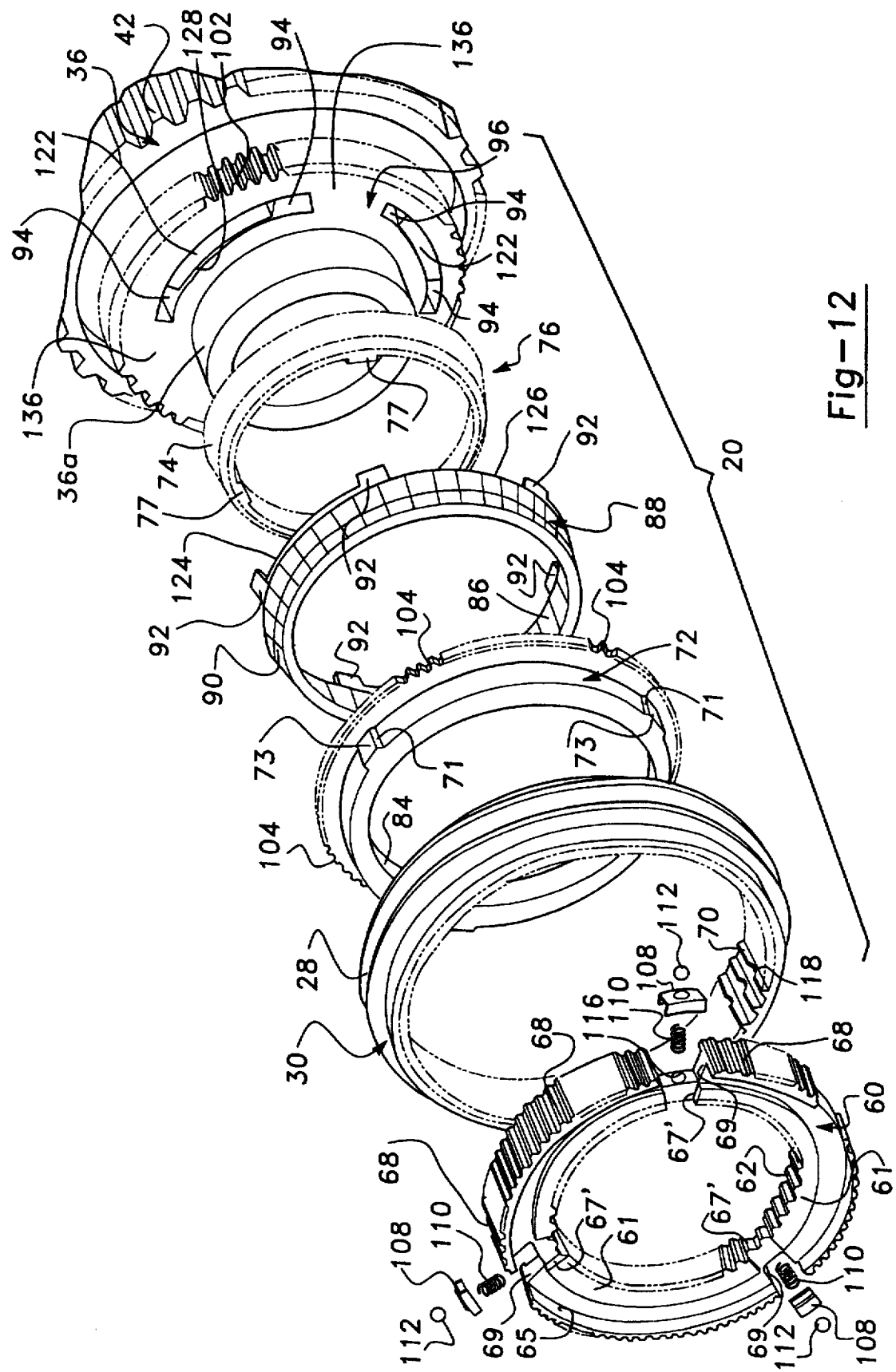
FIG. 12 is an exploded perspective view of the modular synchronizer assembly assembled to define the dual-cone synchronizer shown in FIG. 1.

As best seen in FIGS. 2 and 3, synchromesh clutch unit 20 is bi-directional and, in addition to shift sleeve 30, includes a clutch hub 60 having an inner web segment 61 that is fixed to mainshaft 14 through engagement of hub internal splines 62 with mainshaft external splines 64. Hub 60 also includes an outer cylindrical rim portion 65 having an externally-splined surface 68 formed thereon. Shift sleeve 30 is mounted for rotation with hub 60 by means of its internally-splined surface 70 being in sliding intermeshed engagement with externally-splined surface 68 of hub 60. Thus, shift sleeve 30 is axially moveable in fore and aft directions on hub 60 by means of corresponding movement of shift fork 24 and rail 26 via manipulation by the vehicle operator of a gearshift lever (not shown) that is operably connected to gearshift mechanism 18. It will be noted in FIG. 12 that hub 60 is formed with three equally-spaced non-toothed locator slots 69 for reasons to be explained below. In addition, web 61 is also provided with three equally-spaced guide slots 67 for reasons to be explained below.

Since synchromesh unit 20 is symmetrical about a central transverse plane, as indicated by construction line "L" in FIG. 2, like numbers will be used to describe right and left hand parts, with the left hand parts being identified with primed reference numbers. Thus, only the structure and operation of the right hand or first speed clutch components of dual-cone synchromesh clutch unit 20 will be described with specificity, since those skilled in the art will understand the structure and operation of the second speed clutch components to be substantially identical thereto. Furthermore, while the preferred embodiment illustrates the use of identical and/or mirror-imaged components for the left and right hand portions of dual-cone synchromesh clutch unit 20, it will be appreciated that such use is not a limitation to the present invention.

Dual-cone synchromesh clutch unit 20 also includes a first ring member, hereafter referred to as blocker ring 72, which has three raised lugs 73 that are equally spaced therearound, and a first cone surface 84 formed on its interior surface. Each lug 73 is adapted to be loosely nested within one of locator notches 69 in hub 60, thereby fixing blocker ring 72 for rotation with hub 60. As is known in the synchronizer art, during the synchronizing process, blocker ring 72 indexes or "clocks" such that lugs 73 have one of their respective side faces 71 in contact with an edge of locator slots 69 in hub 60 to inhibit further axial travel of shift sleeve 30 until speed synchronization is completed. A second cone surface 74 is illustrated as being formed on an exterior surface of a second ring member, hereafter referred to as inner cone ring 76. Inner cone ring 76 also includes three equally-spaced radially inwardly projecting locator tabs 77 that are adapted to nest within guide slots 67 formed in web segment 61 of hub 60, thereby fixing inner cone ring 76 for common rotation with hub 60. In addition, inner cone ring 76 includes a radial flange 78 having a central aperture 80 therein which defines a clearance with a hub portion 36a of first speed gear 36.

Dual-cone synchromesh clutch unit 20 is also shown to include a third ring member, hereinafter referred to as reaction cone ring 88, having a first conical friction surface 90 located on its exterior surface and a second conical friction surface 86 located on its interior surface. As used in the dual-cone arrangement, first friction surface 90 is adapted to contact first cone surface 84 while second friction surface 86 is adapted to contact second cone surface 74 upon energization of synchronizer 20. It will be noted that, in the disclosed embodiment, friction surfaces 86 and 90 include a friction pad or lining that is bonded or cemented to the interior and exterior conical surfaces, respectively, of reaction cone ring 88 for providing effective frictional engagement. An example of one type of suitable friction lining that may be used with the present invention is disclosed in U.S. Pat. No. 4,267,912 issued May 29, 1981 to Bauer, et al, the disclosure of which is expressly incorporated by reference herein.

As best seen in FIGS. 2 and 8 through 12, reaction cone ring 88 has six locking fingers 92 formed integral therewith which are uniformly spaced on 60° centers. Each locking finger 92 is adapted to be disposed in an aperture 94 formed in a clutch plate 96 that, in turn, is fixed (i.e., welded) to first speed gear 36. Clutch plate 96 also includes a recessed surface 122 between every other pair of apertures 94, with apertures 94 and recessed surfaces 122 defining an arcuate slot 128. In addition, clutch plate 96 has clutch teeth 102 which are coaxial and alignable with blocker teeth 104 formed on a raised outer circumference portion of blocker ring 72. Both clutch teeth 102 and blocker teeth 104 are meshingly engageable with shift sleeve internally-splined surface 70 upon shift sleeve 30 being axially shifted from the Neutral (N) position shown into its First Gear (1ST) position. In a like manner, clutch plate 96' has clutch teeth 102' that are coaxial and alignable with blocker teeth 104' of blocker ring 72'. Both clutch teeth 102' and blocker teeth 104' are meshingly engageable by shift sleeve internal splined surface 70 upon shift sleeve 30 being axially shifted from the Neutral (N) position into its Second Gear (2ND) position. As will be appreciated, clutch plates 96 and 96' could alternatively be formed as an integral toothed flange portions of speed gears 36 and 34, respectively. Reaction cone ring 88 is also shown to include first edge segments 124 between every other pair of locking fingers 92 and second edge segments 126 between every other remaining pair of locking fingers 92. In terms of size, first edge segments 124 extend axially beyond second edge segments 126. The extent of the axial difference between edge segments 124 and 126 is most clearly seen in FIGS. 9 and 10.

Dual-cone synchromesh clutch unit 20 also includes three equally-spaced strut-type thrust mechanisms each having a helical coil spring 110 which is compressed and inserted between a ball 112 and hub 60. In the particular embodiment shown, each thrust mechanism is located in a locator slot 69 formed in hub 60. A lower portion of each coil spring 110 is disposed within a spring seat bore 116 extending radially into hub web 61. Each ball 112 extends partially through a strut key 108 so as to be biased by spring 110 into engagement with a detent groove 118 circumferentially formed in internally-splined surface 70 of shift sleeve 30, thereby locating shift sleeve 30 is in its "Neutral" position. Coil springs 110 are sized to produce a sufficient force for normally biasing balls 112 in a radially outward direction and yet permit balls 112 to move in a radially inward direction upon axial movement of shift sleeve 30. For example, initial rightward axial movement of shift sleeve 30 toward first speed gear 36 causes balls 112 and strut keys 108 to move concurrently so as to move strut keys 108 into engagement with blocker ring 72. Such engagement causes axial movement of blocker ring 72 which, in turn, results in frictional engagement between the facing friction and cone surfaces, thereby energizing synchronizer 20. Once speed synchronization is completed, balls 112 are forcibly urged to move radially inwardly in response to continued axial movement of shift sleeve 30. It will be appreciated that balls 112 and springs 110, as illustrated and described herein, are merely exemplary of components commonly associated with synchronizer mechanisms. It should also be appreciated that any suitable strut or strutless-type of synchronizer may also be utilized with the present invention.

When the set of components is assembled into the dual-cone synchronizer arrangement, reaction cone ring 88 is oriented such that its locking fingers 92 project into apertures 94 and each of its edge segments 124 is aligned in facing opposition to a recessed surface 122 of clutch plate 96. Thus, blocker ring 72 and inner cone ring 76 maintain reaction cone ring 88 in a proper spacial relationship with respect to clutch plate 96. The resulting gap "A", which is provided between edge segments 124 of reaction cone ring 88 and recessed surfaces 122 of clutch plate 96, is referred to as a "wear" gap. Wear gap "A" provides a wear allowance between the friction surfaces of inner cone ring 76, reaction cone ring 88 and blocker ring 72.

According to the present invention, the components of the modular synchronizer assembly are interchangeable for use in either of the single-cone or dual-cone arrangements. As such, the components of single-cone synchromesh clutch unit 22 are the same as the above-described components of dual-cone synchromesh clutch unit 20, except that inner cone ring 76 is removed and reaction cone ring 88 is indexed 60°. Accordingly, the reference numerals used to designate the components of dual-cone synchromesh clutch unit 20 are also used hereinafter in representing the same components of single-cone synchromesh clutch unit 22. In the bi-directional single-cone synchronizer arrangement shown, hub 60 is affixed to countershaft 16 between speed gears 52 and 59 through engagement of hub internal splines 62 with external splines 130 on countershaft 16.

Figure 4:
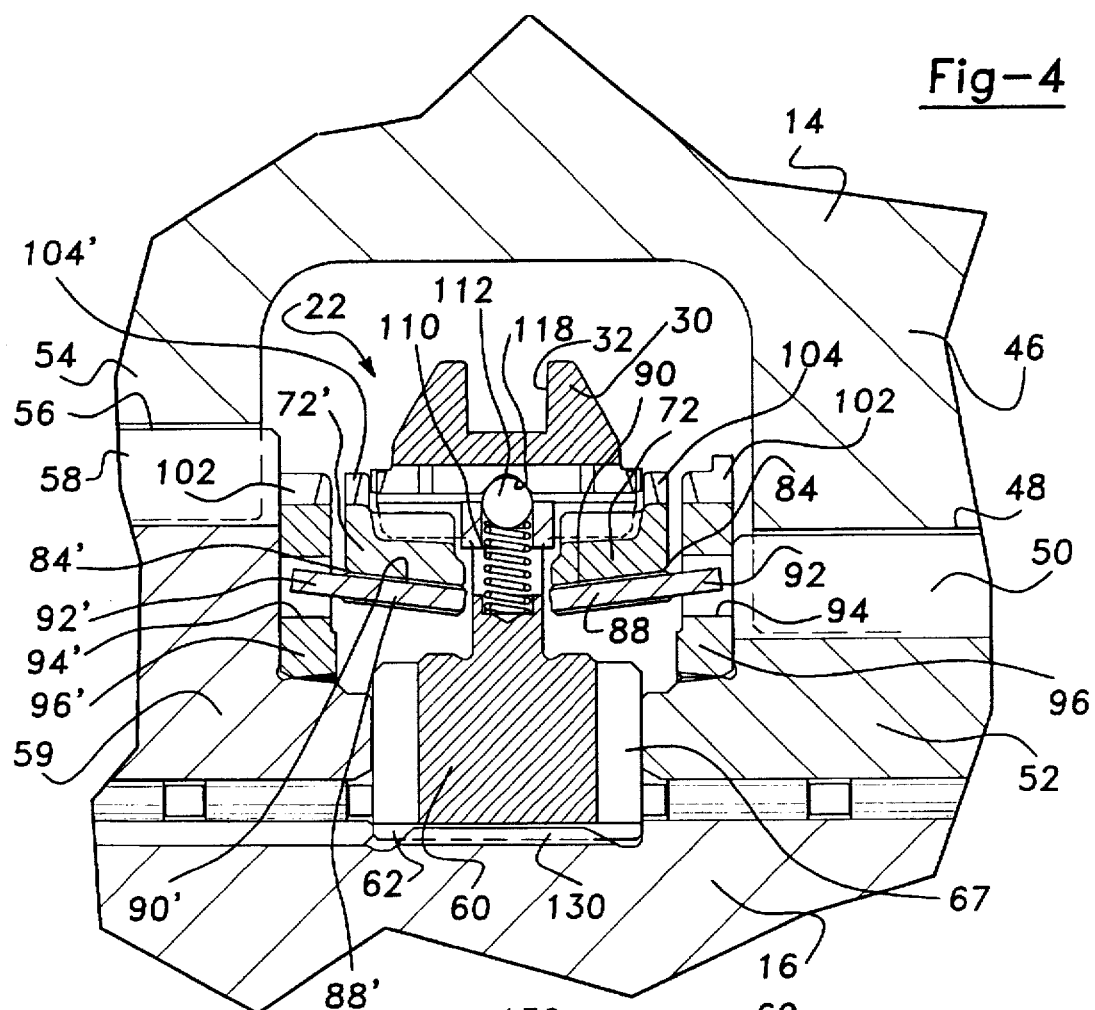
FIG. 4 is an enlarged partial view of the single-cone synchronizer shown in FIG. 1.
Figure 5:
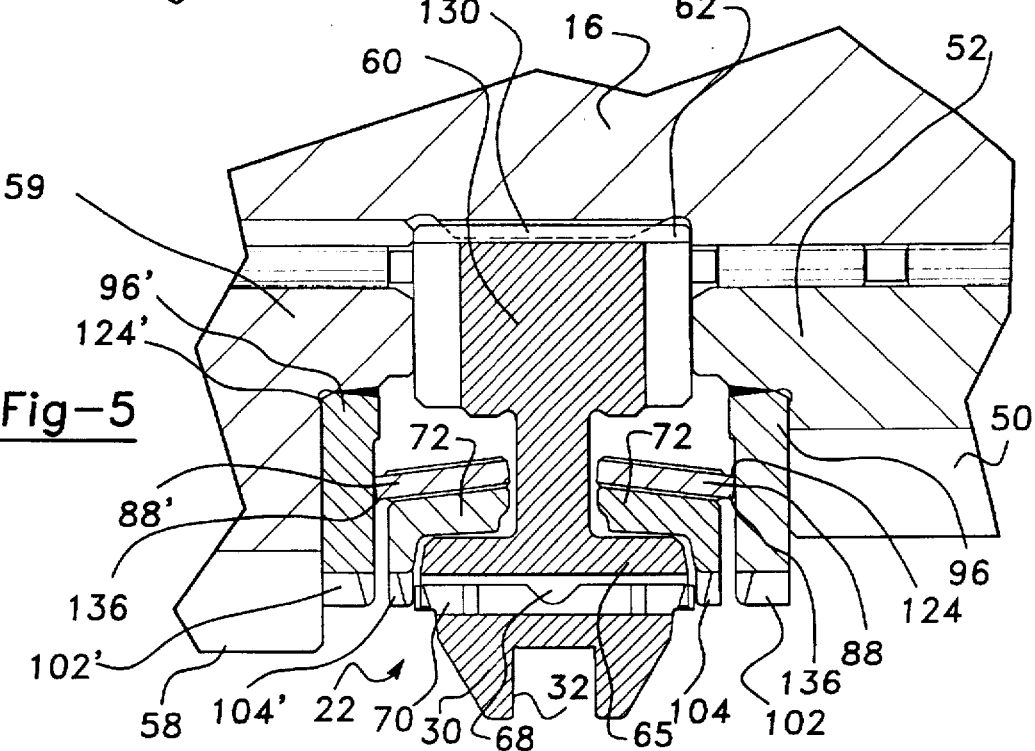
FIG. 5 is another enlarged partial view of the single-cone synchronizer shown in FIG. 1.
Figure 9:
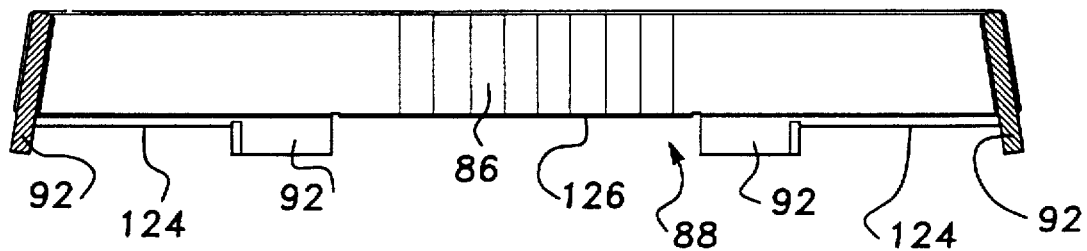
FIG. 9 is a cross-sectional view generally taken along line 9—9 of FIG. 8.
Figure 10:
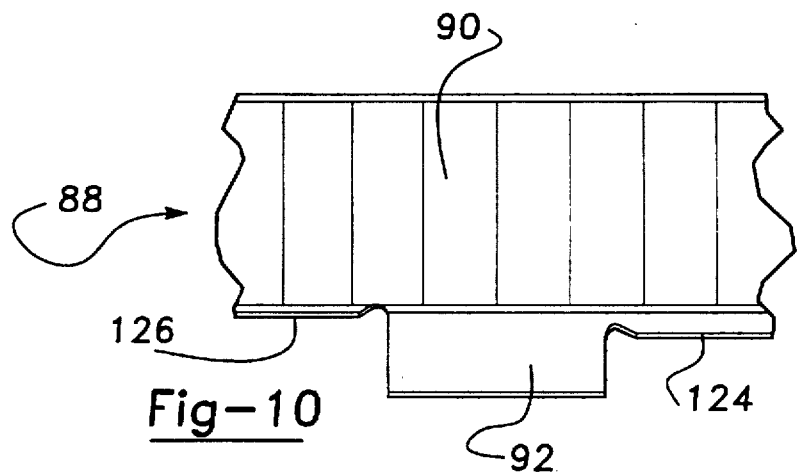
FIG. 10 is a fragmentary view of a portion of the external surface of the reaction cone ring illustrating the axially-extending and axially-recessed edge segments thereof.
Figure 11:
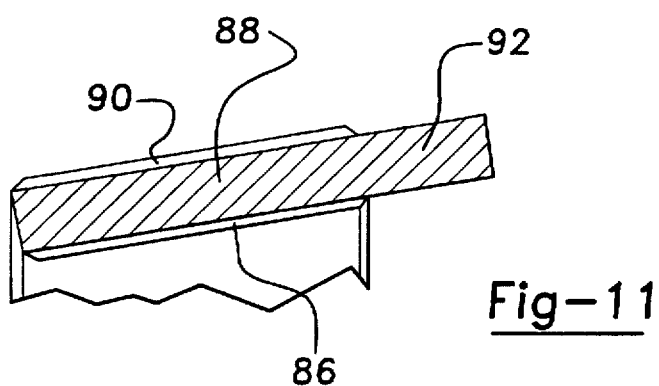
FIG. 11 is an enlarged partial sectional view of the reaction cone ring.

With respect to FIGS. 4 and 5, single-cone synchromesh clutch unit 22 is shown in greater detail. In this arrangement, reaction cone 88 is aligned with its locking fingers 92 nested within apertures 94 in clutch plate 96 and its edge segments 124 in direct contact with planar non-recessed side surfaces 136 of clutch plate 96. As seen, clutch plate 96 is fixedly secured to third speed gear 52. In this way, reaction cone ring 88 is properly supported in an axial direction by clutch plate 96 so that proper frictional contact is obtained between blocker ring 72 and reaction cone ring 88 when blocker ring 72 is shifted axially by movement of shift sleeve 30.

According to this invention, reaction cone ring 88 and blocker ring 72 are used for dual-cone synchromesh clutch unit 20 as well as for a single-cone synchromesh clutch unit 22. In particular, axially-extending edge segments 124 and axially-recessed edge segments 126 of reaction cone ring 88 are provided to insure that reaction cone ring 88 can be interchangeably used by simply indexing reaction cone ring 88 when installed in the single-cone synchronizer arrangement as compared to when installed in the dual-cone synchronizer arrangement. This "indexing" prevents axial contact between reaction cone 88 and clutch plate 96, insuring that dual-cone synchronizer 20 is properly positioned by inner ring 76 contacting a face surface of clutch plate 96.

The above described design allows the use of a set of common components for building either single-cone synchronizers or dual-cone synchronizers. In summary, the components associated with the set of component defining the modular synchronizer assembly include hub 60, shift sleeve 30, blocker ring 72, reaction cone ring 88, inner cone ring 76 and clutch plate 96. According to the present invention, the use of single-cone and dual-cone synchronizer devices in a power transmission device (i.e., transmission, transaxles, transfer cases, compounders, etc.) can now be greatly simplified due to the fact that common synchronizer rings and reaction rings can be used for both types of synchronizers. The ability to use common elements in single-cone and dual-cone synchronizer devices greatly decreases the cost of production of an automotive transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synchronizer for use in a power transfer device having a shaft, comprising:
   a hub adapted to be affixed for rotation with the shaft;
   a gear adapted to be rotatably supported on the shaft and having clutch teeth formed thereon, said gear including a side surface having a plurality of apertures formed therein and axially-recessed surfaces formed between every other aperture;
   a shift sleeve coupled to said hub for rotation therewith and axial movement thereon from a neutral position to a first operative position whereat said shift sleeve engages said clutch teeth for coupling said gear for rotation with the shaft;
   a first ring adapted to be concentrically disposed about the shaft and having a conical surface, said first ring engaging said hub for rotation therewith; and
   a cone ring adapted to be concentrically disposed about the shaft and having a first friction surface for friction engagement with said conical surface of said first ring, said cone ring including a plurality of locking fingers retained within said apertures in said gear, and wherein said cone ring includes an axially-extending segment between every other pair of locking fingers and an axially-recessed segment between every other remaining pair of locking fingers.

2. The synchronizer of claim 1 further comprising a second ring adapted to be concentrically disposed about the shaft and having a conical surface which frictionally engages a second friction surface of said cone ring.

3. The synchronizer of claim 2 wherein said cone ring is oriented relative to said gear such that said axially-extending segments of said cone ring are located in facing opposition to said axially-recessed surfaces of said gear.

4. The synchronizer of claim 2 further comprising means for coupling said second ring for rotation with said hub.

5. The synchronizer of claim 4 wherein said hub is provided with a plurality of slots and said second ring is provided with a plurality of corresponding tabs which engage said slots in said hub.

6. The synchronizer of claim 1 wherein said hub is provided with a plurality of notches and said first ring is provided with a plurality of corresponding lugs located within said notches in said hub.

7. The synchronizer of claim 1 wherein said cone ring is oriented relative to said gear such that said axially-recessed segments of said cone ring are located in facing opposition to said axially-recessed surfaces of said gear.

8. A modular synchronizer assembly for use in a power transfer apparatus having a driven member and a non-driven member rotatably supported on the driven member, a set of components comprising:
   a hub adapted to be fixed for rotation with the driven member;
   a clutch plate adapted to be fixed to the non-driven member adjacent to said hub and which has clutch teeth formed thereon, said clutch plate including a side surface having a plurality of apertures formed therein and axially-recessed surfaces formed between every other pair of said apertures;
   a shift sleeve adapted to be slidably coupled to said hub for rotation therewith and axial movement thereon from a neutral position to an operative position whereat the shift sleeve engages said clutch teeth for coupling the non-driven member for common rotation with the driven member;
   a first ring adapted to be coupled for common rotation with said hub and having an internal conical surface;
   a second ring adapted to be coupled for rotation with said hub and having an external conical surface; and
   a third ring adapted to be disposed between said first and second rings and having a first friction surface adapted for friction engagement with said internal conical surface of said first ring and a second friction surface adapted for frictional engagement with said external conical surface of said second ring, said third ring further including a plurality of locking fingers which are each adapted to be located in one of said plurality of apertures in said clutch plate, axially-extending edge segments formed between every other locking finger, and axially-recessed edge segments formed between every other remaining locking finger;
   wherein the components can be assembled into either a single-cone or a dual-cone synchronizer for causing speed synchronization between the non-driven member and the driven member in response to movement of said shift sleeve to its operative position, whereby in said dual-cone arrangement, said third ring is located with its locking fingers inserted into said apertures on said clutch plate such that its axially-extending edge segments are aligned with and define a gap relative to said axially-recessed surfaces of said clutch plate, and whereby in said single-cone arrangement, said second cone is removed and said third ring is located with its locking fingers inserted into said apertures in said clutch plate such that its axially-recessed edge segments are aligned with said axially-recessed surfaces of said clutch plate and its axially-extending edge segments contact said side surface of said clutch plate.

9. A synchronizer comprising:
   a driven member;
   a non-driven member having a plurality of apertures formed therein;
   a shift sleeve coupled for rotation with said driven member and axial movement relative thereto between a neutral position whereat said shift sleeve is disengaged from said non-driven member for permitting relative rotation therebetween and a first operative position whereat said shift sleeve is engaged with said non-driven member for coupling said non-driven member for common rotation with said driven member;

a first ring coupled to said driven member and having a conical surface; and a cone ring having a friction surface for frictional engagement with said conical surface of said first ring, said cone ring having a plurality of locking fingers each of which is retained in one of said plurality of apertures formed in said non-driven member, and said cone ring further includes an axially-extended segment between every other pair of locking fingers and an axially-recessed segment between every other remaining pair of locking fingers.

10. The synchronizer of claim 9 further comprising a second ring having a conical surface which frictionally engages a second friction surface of said cone ring.

11. The synchronizer of claim 10 further comprising means for coupling said second ring for rotation with said driven member.

12. The synchronizer of claim 9 wherein said non-driven member includes axially-recessed surfaces between every other aperture such that said axially-extended segments of said cone ring are in facing opposition to said axially-recessed surfaces of said non-driven member.

13. The synchronizer of claim 9 wherein said axially-recessed segments of said cone ring are located in facing opposition to a axially-recessed surfaces formed in said non-driven member.

14. The synchronizer of claim 9 wherein said driven member is a hub that is fixedly secured to a rotating shaft, and said non-driven member is a clutch plate fixedly secured to a gear rotatably supported on said shaft.

15. A cone ring for a speed synchronizer device including a ring member having a front edge surface, a rear edge surface, and external and internal conical friction surfaces extending between said front and rear edges and which are parallel with respect to each other, said ring member having a plurality of locking fingers extending outwardly beyond said rear edge surface and which extend in a common plane with said internal and external friction surfaces, and said rear edge surface having a first edge segment between every other pair of said locking fingers and a second edge segment between every other remaining pair of locking fingers with said first edge segments extending axially beyond said second edge segments.

* * * * *